United States Patent [19]
Miller et al.

[11] Patent Number: 5,543,447
[45] Date of Patent: Aug. 6, 1996

[54] STABILIZATION OF RED AMORPHOUS PHOSPHORUS BY ORDERED POLYMERIC STRUCTURES FOR THE MANUFACTURE OF NON-EMISSIVE FIRE RETARDANT PLASTICS

[75] Inventors: Michael A. Miller; Scott F. Timmons; Darren E. Barlow, all of San Antonio, Tex.

[73] Assignee: Southwest Research Institute, San Antonio, Tex.

[21] Appl. No.: 314,340

[22] Filed: Sep. 28, 1994

[51] Int. Cl.$^6$ .................................................. C08K 3/02
[52] U.S. Cl. .................... 524/80; 523/205; 523/451; 524/405; 524/406; 524/409; 524/436; 524/437
[58] Field of Search .......................... 524/80, 411, 412, 524/405, 406, 409, 436, 437; 523/205, 206, 207, 210, 451

[56] References Cited

U.S. PATENT DOCUMENTS

| | | |
|---|---|---|
| 3,637,595 | 1/1972 | Cottis et al. . |
| 4,105,735 | 8/1978 | Dany et al. . |
| 4,150,188 | 4/1979 | Brulet . |
| 4,187,207 | 2/1980 | Cerny et al. . |
| 4,208,317 | 6/1980 | Cerny et al. . |
| 4,395,513 | 7/1983 | Calundann ............................ 528/209 |
| 4,405,732 | 9/1983 | Chao et al. . |
| 4,416,728 | 11/1983 | Albanesi et al. . |
| 4,440,810 | 4/1984 | Forker . |
| 4,440,880 | 4/1984 | Albanesi et al. . |
| 4,471,080 | 9/1984 | Rinaldi et al. . |
| 4,493,913 | 1/1985 | Hirobe et al. . |
| 4,584,149 | 4/1986 | Alfonso et al. . |
| 4,639,504 | 1/1987 | Cottis ..................................... 528/207 |
| 4,670,487 | 6/1987 | Nielinger et al. . |
| 4,698,215 | 10/1987 | Albanesi et al. . |
| 4,740,532 | 4/1988 | Silver . |
| 4,740,537 | 4/1988 | Silver . |
| 4,785,031 | 11/1988 | Karger et al. . |
| 4,877,823 | 10/1989 | Plachetta et al. . |
| 4,879,067 | 11/1989 | Sakon et al. . |
| 4,921,896 | 5/1990 | Bonin et al. . |
| 4,985,485 | 1/1991 | Bonin et al. . |
| 5,026,757 | 6/1991 | Sakon et al. . |
| 5,041,490 | 8/1991 | Sakon et al. . |
| 5,158,999 | 10/1992 | Swales . |
| 5,206,276 | 4/1993 | Lee . |
| 5,278,254 | 1/1994 | Furuta et al. ............................ 524/80 |

FOREIGN PATENT DOCUMENTS

| | | |
|---|---|---|
| 842699 | of 0000 | European Pat. Off. . |
| 59850 | 9/1952 | European Pat. Off. . |
| 2642835 | 4/1978 | European Pat. Off. . |
| 81107981 | 10/1981 | European Pat. Off. . |
| 84106053 | 5/1984 | European Pat. Off. . |
| 85115289 | 12/1985 | European Pat. Off. . |
| 85116425 | 12/1985 | European Pat. Off. . |
| 283759 | 9/1988 | European Pat. Off. . |

(List continued on next page.)

OTHER PUBLICATIONS

*European Polymers Paint Colour Journal*—Jul. 28, 1993—p. 371.
Phosphorus—Based Chemicals: Tosoh Takes Aim at U.S. Market—*Flame Retardancy News*—Feb., 1994, V. 4, No. 2.
McNeil Akron Repiquet Acquires Halogen–Free Cable Production Capability—*Flame Retardancy News*—Jul., 1993, V. 3, No.7.
Flame Retardant Design for PMMA Reviewed—*Flame Retardancy News*—Jul. 1993, V. 3, No. 7.

(List continued on next page.)

Primary Examiner—Veronica P. Hoke
Attorney, Agent, or Firm—Stinson, Mag & Fizzell

[57] ABSTRACT

A novel plastic composition and method for making the same comprising a host polymer having substantially uniformly distributed therethrough a non-miscible liquid crystal polymer and red amorphous phosphorus. The liquid crystal polymer is present in a concentration sufficient to encapsulate said red amorphous phosphorus such that a substantial portion of the red amorphous phosphorus does not contact the host polymer.

29 Claims, 5 Drawing Sheets

FOREIGN PATENT DOCUMENTS

| | | |
|---|---|---|
| 227764 | 7/1989 | European Pat. Off. . |
| 90119639 | 10/1990 | European Pat. Off. . |
| 574054 | 12/1993 | European Pat. Off. . |
| 75 18040 | 6/1975 | France . |
| 75 18038 | 6/1975 | France . |
| 76 8607 | 3/1976 | France . |
| 26468351 | 10/1976 | Germany . |
| 57-35027 | 3/1982 | Japan . |
| 60-168354 | 7/1985 | Japan . |
| 61-06662 | 5/1986 | Japan . |
| 62-276630 | 10/1987 | Japan . |
| 2-295258 | 11/1990 | Japan . |
| 3-351264 | 12/1991 | Japan . |
| 4-27154 | 1/1992 | Japan . |
| 4-46658 | 3/1992 | Japan . |
| 4110340 | 4/1992 | Japan . |
| 5-78560 | 3/1993 | Japan . |
| 2250291 | 6/1992 | United Kingdom . |

OTHER PUBLICATIONS

Phosphorus–Nitrogen Combinations Considered—*Flame Retardancy News*—Jul., 1993, V. 3, No. 7.

Flame Retardant Resin Introduced—*Flame Retardancy News*—Jun., 1993, V. 3, No. 6.

Report from the Polymer Research Institute—*Flame Retardancy News*—May, 1993, V. 3, No. 5.

Additives: New Intumescent Phosphorus–Based Fire Retardants—*Plastics Engineering*—Nov. 1993, p. 29.

Flameproofed Thermoplastic Molding Compositions Are Based on Phlegmatized Red Phosphorus—*Flame Retardancy News*, Nov., 1992.

Article—Industrial F. B. Additives Compared: A Review of the Mechanisms Involved—*Flame Retardancy News—Sep., 1992*.

Article—Yunnan is Developing its Phosphate Chemical and Rubber Processing . . . —*China Chemical Reporter*—Nov. 4, 1992, p. 5.

Article—New System Applying Nonhalogen Flame Retardant . . . —*Japan Chemical Weekly—Jun. 18, 1992, p. 1*.

Flame–Retardant Chemicals: Markets by Product Type: Properties of . . . —*Business Communications Co.*—Aug. 1993.

Flame–Retardant Chemicals: Markets by Product Type: Phosphorus–Based . . . —*Business Communications Co.*—Aug. 1993.

Flame Retardant Chemicals: Markets by Product Type: Phosphorus—Based . . . —*Business Communications Co.*—Aug. 1993.

Flame Retardant Chemicals: Plastics Market Segments: Epoxy—*Business Communications Co.*—Mar. 1990.

Table 22—Flame Retardants in Epoxy—1989 Consumption—*Business Communications Co., Inc.*

Conference Proceeding: 1992 Proc. Flame Retard.—New compounding procedures for red phosphorus–based master batches—Agunlope et al 1992.

Dynamics of Current Developments in Fire Safety of Polymers—Mar. 20, 1988.

*Developments in Inorganic Phosphorus Flame Retardants* by J. Stephenson.

Amgard Flame Retardants: Amgard Crp. by Warley—1983.

Flameproofed Plastic Compositions by J. Cerny & G. Vivant dated Jun. 17, 1980.

Flame–Retardant Polyester Moulding Compositions by R. S. Williams.

Stabilized and Carried Red Phosphorus as Flame–Retardant Agent for Polymers by L. Scarso.

BLEND

Fig. 4B

LCP/RAP

HOST POLYMER

Fig. 4C

LCP
RAP

EXTRUDATE

Fig. 4D

LCP FIBRILS

HOST POLYMER

Fig. 4E

FIBRIL
RAP
LCP

Fig. 4F

STABILIZATION OF RED AMORPHOUS PHOSPHORUS BY ORDERED POLYMERIC STRUCTURES FOR THE MANUFACTURE OF NON-EMISSIVE FIRE RETARDANT PLASTICS

FIELD OF THE INVENTION

The invention relates to novel plastics and methods of making the same containing red amorphous phosphorus (RAP) as the fire retardant component. The novel compositions equal or exceed the fire retardant benefits of current day polymeric systems which incorporate RAP, yet do not emit phosphine gases at unacceptable toxic levels.

BACKGROUND INFORMATION

Many current day polymeric systems utilize RAP as a fire retardant additive. In some of the current day systems, particulate RAP is added to the polymeric system during the processing stage. Utilized in this manner, RAP has been an effective flame retardant for many thermoplastics and operates in both the vapor and condensed phases. For example, U.S. Pat. Nos. 4,105,735; 4,187,207; and 4,670,487.

In other systems, RAP is encapsulated in another polymer before introduction to the host polymer in hopes of reducing the emission of phosphorus gases. For example, U.S. Pat. No. 4,208,317 discloses encapsulating RAP in various polymers, none of which have the highly successful liquid crystalline structure of the liquid crystal polymer utilized in this invention. Other examples of RAP encapsulation are shown in U.S. Pat. Nos. 4,440,880 and 4,471,080, none of which have successfully decreased the phosphine emissions to acceptable, non-toxic levels.

While the benefits of RAP as a fire retardant additive in plastics are many as shown by the previously cited patents, RAPs' potential use is seriously compromised by its propensity to undergo hydrolysis followed by emission of the highly toxic gas phosphine ($PH_3$). This emission of phosphine from materials comprised of a RAP containing polymer has far-reaching implications in terms of the future commercialization of any plastic product containing RAP. For example, many fire retardant products containing RAP are used in confined enclosures with limited ventilation, such as modern energy efficient buildings. The limited ventilation leads to accumulation of toxic levels of phosphine emitted from the enclosures.

To date, no RAP containing fire retardant plastic formulations or technologies exist which yield acceptable, non-toxic phosphine emission levels. Consequently, a need exists for a plastic formulation and technology that is capable of reducing phosphine emissions from RAP containing formulations to non-toxic levels while maintaining the fire retardant benefits.

SUMMARY OF THE INVENTION

In accordance with this invention, novel polymeric systems containing RAP and processes for making the same have been developed. The novel compositions, when incorporated in products such as electrical wire coatings, plastic wall units, etc., do not emit toxic levels of phosphine gas, yet maintain or exceed the fire retardant benefits of current day plastics containing RAP. In the disclosed novel approach, RAP is initially mixed with a liquid crystal polymer (LCP) which has a melt temperature approximately equal to RAP's auto ignition temperature. The mixture of RAP and LCP is then combined with a host polymer that is immiscible with the LCP.

Figure 1A:
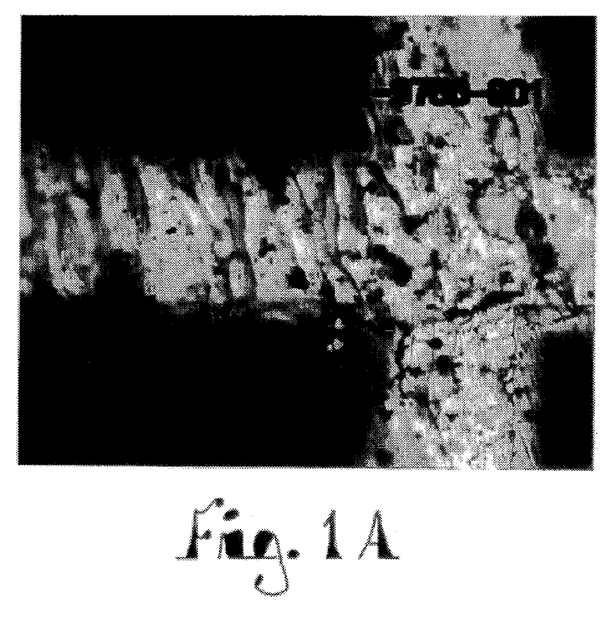
FIGS. 1A–1D are Polarized-Light Photomicrographs of Thinly Sectioned (5 μm) Non-Emissive Fire Retardant Plastic Comprising Encapsulated RAP (10% By Weight) in a Linear Low Density Polyethylene Polymer (LLDPE) made with a shear mixer.
Figure 1B:
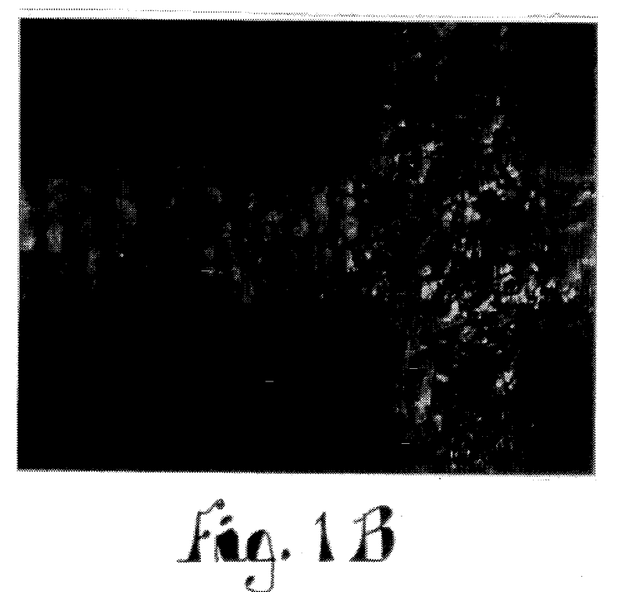
Figure 1C:
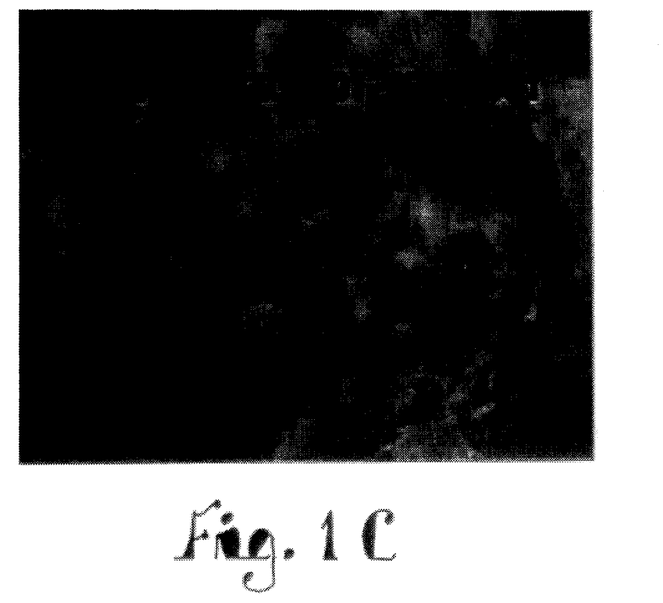
Figure 1D:
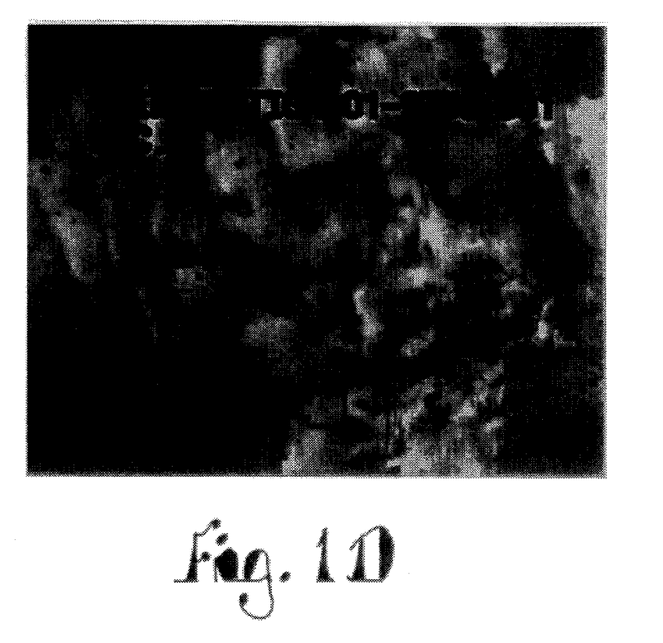

Polarized-light photomicrographs of the novel plastic (FIG. 1A–1D) show the LCP encapsulates the RAP such that most of the RAP does not contact the host polymer. As shown in FIG. 1A, the encapsulated RAP is the dark brown dots within the yellow host polymer. The fire resistance of the novel composition exceeds or is comparable to the fire resistance of current day polymeric systems which contain RAP, yet the phosphine emissions from the novel compositions are dramatically lower than emissions from current day RAP containing plastics. Although not wanting to be limited to one theory, the encapsulation is believed to provide ultimate stability of the RAP against the onset of hydrolysis by exogenous water which would ordinarily yield the toxic gas phosphine.

BRIEF DESCRIPTION OF THE DRAWINGS

The file of this patent contains at least one photograph executed in color. Copies of this patent with color photographs will be provided by the Patent and Trademark Office upon request and payment of the necessary fee.

DETAILED DESCRIPTION OF THE PREFERRED EMBODIMENT

To prepare the novel compositions, RAP is mixed with a LCP to form a homogenous mixture of up to about 70% by weight of RAP. Subsequently, dependant on the method of preparation chosen; i.e., blending or extrusion, a host polymer and the RAP/LCP mixture are combined. The host polymer should not be miscible with the LCP. In the final product, the LCP encapsulates the RAP such that a major portion, about 60% to about 100%, of the RAP does not contact the host polymer (see FIGS. 1A–1D). The novel final compositions contain from about 0.1% to about 20% by weight of RAP, the preferred range being about 4% to about 10% by weight; about 0.1% to about 15% of LCP, the preferred range being about 4% to about 10%; and about 65% to about 99.8% of host polymer, the preferred range being about 80% to about 90%.

The LCPs utilized in this invention may be selected from a variety of aromatic polyesters whose melt processing temperature is less than or slightly greater than either the auto ignition temperature of virgin RAP (255° C.) or the auto ignition temperature of a synergist combination of RAP and an additive. For instance, a RAP and magnesium hydroxide blend has an effective auto ignition temperature greater than virgin RAP. Other synergist combinations include mixtures of RAP and aluminum trihydrate, antimony trioxide, zinc borates, molybdenum oxides, or fumed silica treated with an organo-silicon compound. The additives may also be added to the host polymer instead of to the RAP/LCP mixture.

If an additive is utilized, the novel final compositions contain from about 0.1% to about 20% by weight of RAP, the preferred range being about 4% to about 10% by weight; about 0.1% to about 15% of LCP, the preferred range being about 4% to about 10%; about 65% to about 99.8% of host polymer, the preferred range being about 80% to about 90%; and about 1% to about 50% by weight of additive, the preferred range being about 5% to about 20%.

LCPs meeting such a criterion include melt-orienting LCPs which are rigid, rod-like, and highly ordered molecules, both in the molten state, when directional flow is applied, and in the solid state. The mesophase state of suitable LCPs exhibit a multi-domain structure within which there is a high degree of nematic order; that is, a structural state of uniform orientation. Examples include (1) parallel offset copolyesters, the preferred being a parallel offset sold by Hoechst Celanese under the trade name Vectra; (2) copolyester-amides, with the preferred being sold by Hoechst Celanese under the trade name Vectra B-950; (3) rigid misfit copolyesters, the preferred being a rigid misfit copolyester sold by Amoco under the trade name Xydar SRT-300; and (4) bent misfit copolyesters, the preferred bent misfit being sold by Amoco under the trade name Xydar Low T. The preferred of all the available LCPs being the parallel offset copolyester available from Hoechst Celanese and sold under the trade name Vectra.

The parallel offset copolyesters are copolymers of 6-hydroxy-2-naphthalenecarboxylic acid and 4-hydroxybenzoic acid.

The copolyester-amides are copolymers of 1,4-Benzenedicarboxylic acid, aminophenol wherein the $NH_2$ and $OH$ substitution is not specified, and 6-hydroxy-2-naphthalenecarboxylic acid.

The rigid misfit copolyesters are copolymers 1,4,-Benzenedicarboxylic acid, [1,1'biphenyl]-4,4'-diol and 4-hydroxybenzoic acid.

The bent misfit copolyesters are copolymers of 1,4-Benzenedicarboxylic acid, 4-hydroxybenzoic acid, and 1,3-benzenediol.

The bent misfit and rigid misfit copolyesters of this invention are discussed and claimed in U.S. Pat. No. 3,637,595 which is incorporated herein by reference.

The invention employs the structural and processing characteristics of the LCP to take advantage of the fact that in the molten state, highly ordered domains of LCP are formed in regions of counter-current flow and in contact with a fixed geometrical structure. RAP particles within a polymer matrix undergoing elongational flow may be regarded as the immobile geometrical structure with which, at the microscopic level, highly ordered molecular alignment of the LCP occurs around the RAP's surface resulting in the encapsulation of RAP or the entrapment of RAP particles. This constitutes a possible theoretical premise for the present invention and is thought to generate an in situ encapsulation of RAP in the host polymer by the LCP.

Figure 2:
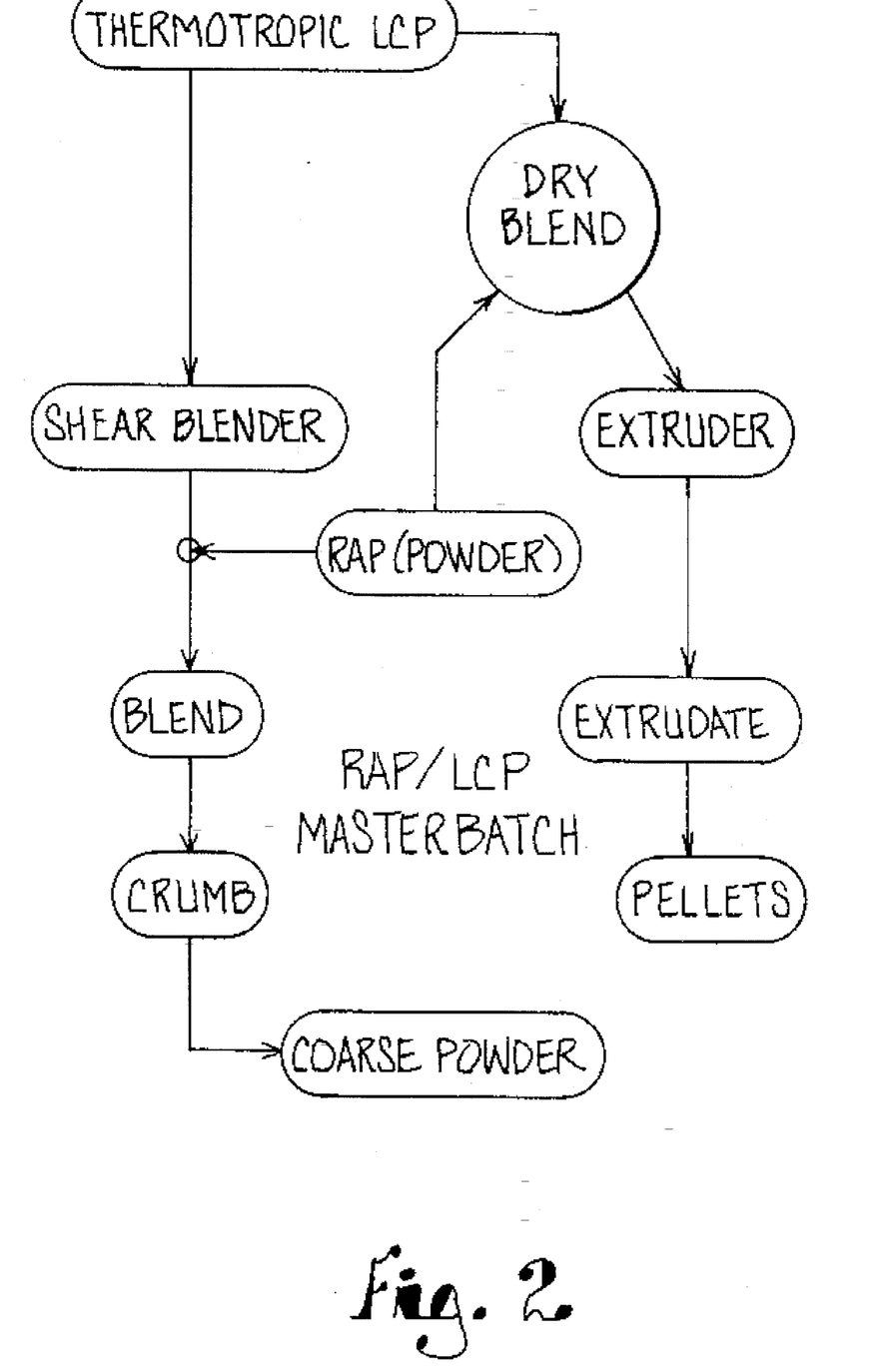
FIG. 2 is a schematic of the preparation techniques for the RAP/LCP masterbatch.

The RAP/LCP mixture is generally prepared by masterbatching. FIG. 2 illustrates the various methods available for preparing the desired masterbatch using either blending or extrusion techniques.

If a shear blender is utilized, the chosen LCP is premelted and kneaded at its melt temperature. As discussed above, the chosen LCP generally has a melt processing temperature less than or slightly greater than either the autoignition temperature of virgin RAP (255° C.) or the autoignition temperature of the synergist combination of RAP. After establishing minimum torque conditions of the free-flowing LCP, finely granulated RAP (5–50 micrometers in diameter) is slowly added to the LCP as it is continuously kneaded under a blanket of argon or nitrogen. Masterbatch compositions of up to about 70% by weight of RAP can be achieved via this method. The mixing of the LCP and RAP components in the described order are necessary to obviate the auto ignition of RAP. After achieving the desired percentage of RAP in LCP and establishing a homogeneous blend, the masterbatch of RAP and LCP is allowed to cool and solidify before removal from the shear mixer. The resultant state of aggregation of the RAP/LCP mixture can then be further processed into irregular crumbs, coarse powder or pellets.

If extrusion techniques are utilized in making the LCP/RAP mixture, a dry mixture of LCP, preferably in pellet form and preferably finely granulated RAP (5–50 micrometer diameter), is added to the extruder in the desired percentages. The RAP/LCP mixture is then extruded at sufficient RPM, from about 5 to about 45 rpm, and at a sufficient temperature from about 245° C. to about 280° C. under an argon or nitrogen blanket applied to the feed zone. The resultant RAP/LCP extrudate can then be pelletized. Again, compositions containing up to about 70% RAP are attainable.

The blender prepared or extrusion prepared RAP/LCP masterbatch, when solidified, are extremely stable, dustless materials that can be safely handled or transported. The masterbatch is typically transformed into a coarse powder, crumb or pellet, depending on the end-use application.

The phosphine emissions of the RAP/LCP masterbatches were compared to other polymer candidates that were considered as possible encapsulating polymers. The phosphine emissions from the RAP/LCP masterbatch of the present invention were exponentially lower than the other polymers considered. (See Example 2 and Table 1.)

After the RAP/LCP masterbatch has been prepared, it is then mixed with the host polymer to effect the final novel product. The host polymer may be selected from a wide variety of commercially available polymers such as polyolefins (e.g., polyethylene and polypropylene), polyethylene terephthalate, polystyrene, ethylene vinyl acetate, polycarbonate, polyurethanes, and epoxy resins, with the preferred being polyethylene and the primary criterion being that the host polymer is not readily miscible with the selected LCP.

Figure 3:
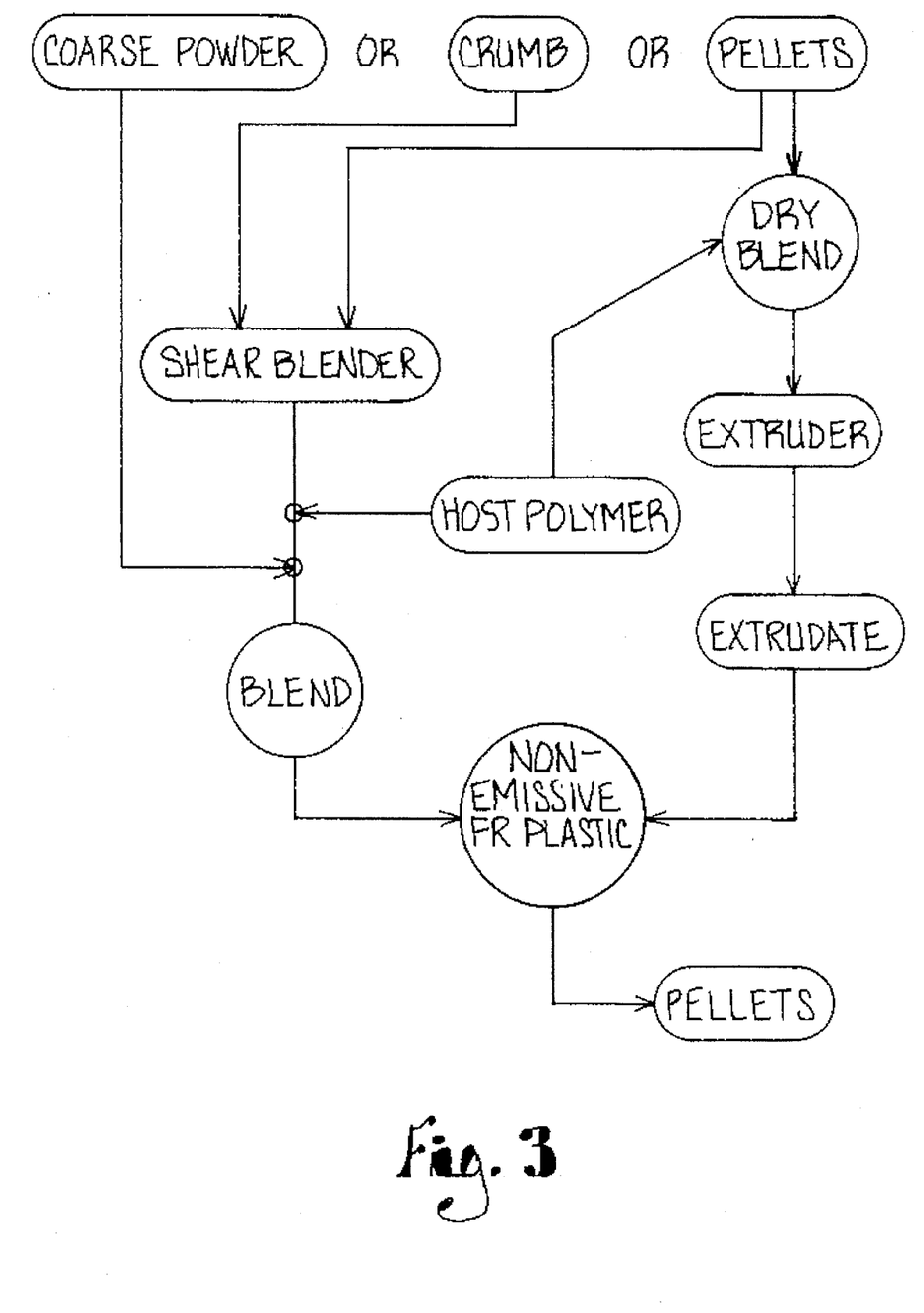
FIG. 3 is a schematic of either the blending or extrusion preparation techniques for the final novel product that has less than about 50% LCP in the masterbatch.

FIG. 3 generally illustrates schematically the preparation of the novel final product. One alternative not illustrated is the occasion wherein a blender is utilized and the LCP content in the LCP/RAP mixture is greater than 50%. In this situation, the host polymer is preferably added in the molten state.

As depicted in FIG. 3, if crumbs or pellets of the masterbatch are used in conjunction with the sheer blender, the RAP/LCP masterbatch is added first to the blender and premelted. The host polymer is then blended with the premelted RAP/LCP masterbatch at a temperature equal to or slightly less than the melt temperature of the LCP. The resultant end product of the present invention has homogeneously dispersed particles of RAP encapsulated by highly oriented domains of LCP. (See FIGS. 1A–1D.)

If coarse powder of the masterbatch is used in conjunction with the shear blender, the host polymer is initially added to the shear blender and melted at a temperature equal to or slightly less than the melt temperature of the LCP. The coarse powder RAP/LCP masterbatch is then added to the blender and blended with the premelted host polymer at a temperature equal to or slightly less than the melt temperature of the LCP. The result in the end product has homogeneously dispersed particles of RAP encapsulated by highly oriented domains of LCP as reflected in FIGS. 1A–1D.

Figure 4A:
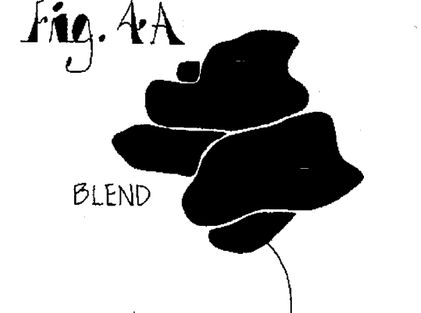
FIGS. 4A–4F are a diagrammatic representation of the internal morphologies that are attainable by methods of the present invention for encapsulating RAP in a host polymer using either blending (FIGS. 4A–4C) or extrusion (FIGS. 4D–4F).
Figure 4B:
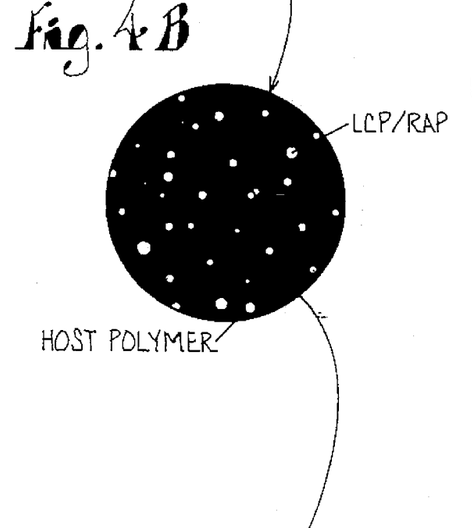
Figure 4C:
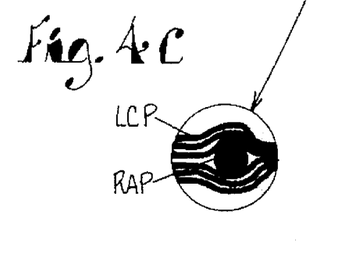
Figure 4D:
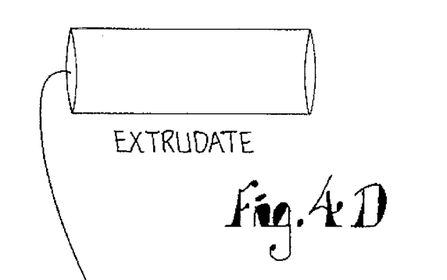
Figure 4E:
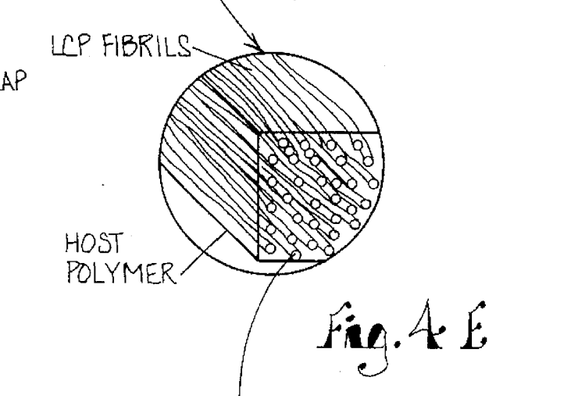
Figure 4F:
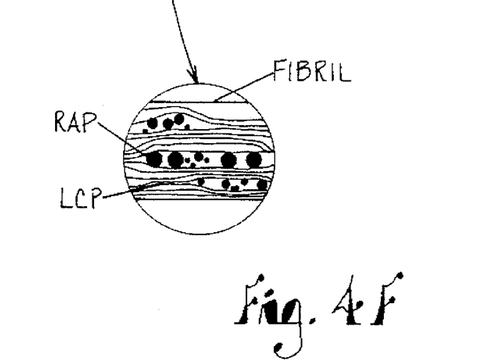

Alternatively, if extrusion techniques are utilized, a dry mixture of host polymer and crumb or pellet form of the RAP/LCP masterbatch is fed to the extruder. The mixture is extruded at about 245° C. to about 280° C., with the preferred being about 245° C. to about 265° C. at the feed zone to the die of the extruder device and at a shear rate ranging from about 5 to about 45 rpm while maintaining a nitrogen or argon blanket at the feed zone. Temperature and shear conditions are adjusted accordingly to sustain a minimum torque and pressure on the extruder device while yielding a homogenous extrudate having an internal structure consisting of highly oriented linear clusters of RAP encapsulated in elongated domains or fibrils of LCP as graphically depicted in FIGS. 4D–4F.

As stated above, and not shown in FIG. 3, if the RAP/LCP masterbatch contains about 50% or more LCP, the host polymer is added to the blender in the molten state. By adding the host polymer in the molten state, sufficient mixing is obtainable between the RAP/LCP masterbatch and the host polymer. Example 6 illustrates the use of the host polymer in the molten state in conjunction with sheer blending.

FIGS. 4A–4F schematically illustrates the differences between the final product of the present invention dependent on whether blending or extrusion techniques are utilized. As illustrated, the precise morphology of encapsulated RAP in the carrier plastic depends on the aggregate state of the LCP/RAP masterbatch and the technique used for preparing the final product. (See FIGS. 4A–4F)

The fire retardant capabilities of the final product of the present invention were compared to current-day polymers containing RAP which is not encapsulated. These tests showed that the novel plastic composition had comparable fire resistant qualities and in some instances exceeded the fire resistive qualities of the current day polymers containing RAP. (See Example 5.)

The novel compositions can be used to prepare electrical wire coatings, metal-plastic composite structural components for storage containers, and other packaging devices, wall units, and other products which require fire resistive characteristics.

EXAMPLE 1

A twin-head counter-rotating shear mixer commonly known to those skilled in the art of polymer blending was used to manufacture high-load masterbatches of RAP/LCP. The LCP Vectra A-950 (Hoechst Celanese) was pre-melted and kneaded at its melt temperature (280° C.) by means of shear mixing. After establishing minimum torque conditions of the free-flowing LCP in the shear mixer, finely granulated RAP (5–50 μm diameter) was slowly added to the mixer as its contents were continuously kneaded under a blanket of nitrogen. The rotational velocity and temperature of the shear mixer provided control over the torque imparted by the blend as additional amounts of RAP were added to the mixer. Masterbatch compositions of up to about 70% by weight of RAP were achieved. The mixing of the LCP and RAP components in the described order were necessary to obviate the auto-ignition of RAP. After achieving the desired percentage of RAP and establishing a homogenous blend, the masterbatch of RAP/LCP was allowed to cool and solidify for removal from the shear mixer. The resultant masterbatch product was further processed into irregular crumbs, coarse powder, or pellets which were dustless and safely transportable.

EXAMPLE 2

A counter-rotating twin screw extruder commonly known to those skilled in the art of plastic extrusion was used to manufacture an extrudate masterbatch of LCP/RAP.

A dry mixture of 90% by weight of LCP (Vectra A-950 available from Hoechst Celanese) in pellet form and 10% by weight of finely granulated RAP (5–50 μm diameter) was added to the extruder. The RAP and LCP were extruded at 45 rpm and at a set temperature configuration of 245°–255°–265°–250° C. from the feed zone to the die of the extruder device with a nitrogen blanket applied to the feed zone. The resultant RAP/LCP extrudate was pelletized for subsequent mixing with a host polymer.

The resultant RAP/LCP pellets were tested against various other plastics containing RAP. Table 1 illustrates that the RAP/LCP masterbatch showed the lowest phosphine emissions after 24 hours.

TABLE 1

Performance Characteristics Of Candidate Encapsulated RAP Systems

| Material | Process | $PH_3$ Emission After 24 h (ppm/(mg RAP)) | |
|---|---|---|---|
| | | Encapsulated | Control[1] |
| Nylon 6,6 | Interfacial Polymerization[2] | 0.867 | 0.419 |
| Nylon 12 (methylene dianiline) | Interfacial Polymerization[2] | 0.880 | 0.375 |
| Cellulose Triacetate | Spinning Disk[3] | 0.487 | 0.772 |
| Barex 210 | Cyclone Spray Dryer[3] | 0.357 | 0.497 |
| Parylene N | Vapor Deposition[4] | 0.732 | 0.641 |
| LCP (Vectra A950) | Extrusion[5] | 0.00349 | 0.500 |

[1]Virgin RAP
[2]Capsular
[3]Microspherical
[4]Conformal coating
[5]Rod extrudate

EXAMPLE 3

A twin-head counter-rotating shear mixer was used to manufacture Applicants' novel non-emissive fire retardant LLDPE containing encapsulated RAP. A high load masterbatch comprising 70% RAP and 30% LCP by weight was prepared by the method described in Example 1. A 200 g aliquot of the finished masterbatch was introduced into the mixer in the form of irregular crumbs and subsequently melted under shear conditions, 35 rpm, at a temperature ranging from 270° to 280° C. An equivalent mass of host polymer (200g of pelletized LLDPE) was then added to this premelted masterbatch during shear mixing to make a 1:1 dilution of masterbatch in host polymer comprising 35% by weight of RAP. This precursory dilution was cooled and allowed to solidify immediately after achieving a homogenous blend.

A 91.4 g mass aliquot of the precursory dilution was remelted under shear conditions at a temperature of 165° C. until well blended. Additional LLDPE (228.6 g) was then added to this precursory dilution while mixing to obtain the target percentage of RAP. Mixing was continued for approximately 15 minutes or until a homogenous blend was achieved, at which time the formulation was cooled and allowed to solidify for removal from the shear mixer. The resultant mixture was the novel composition comprising homogeneously dispersed particles of RAP bounded by highly oriented domains of LCP having a composition of 10% by weight RAP (fire retardant agent), 4.3% by weight LCP (encapsulant), and 85.7% by weight LLDPE (host polymer).

EXAMPLE 4

A twin head counter-rotating shear mixer was used to manufacture novel non-emissive fire retardant linear low density polyethylene (LLDPE). A high load masterbatch comprising 70% RAP and 30% LCP by weight was prepared by the method described in Example 1. A course powder of this masterbatch was obtained by frictional etching to yield a sufficient amount of masterbatch for blending with host polymer. The host polymer (274 g of LLDPE) was pre-melted under shear conditions at 140° C. and 35 rpm. A 45.7 g aliquot of the powdered masterbatch was slowly added to this premelted host polymer during shear mixing, and the temperature of the mixer was immediately raised to 150° C. Mixing was continued until a homogenous blend was achieved. The resultant mixture after solidification contained homogeneously dispersed particles of RAP which were discretely encapsulated by the LCP and whose composition was that which is described in Example 3.

Evidence for the morphological structure of the present example was obtained by cutting thin (5 μm) sections of the resultant blend for observation by differential interference contrast (DIC); a variable light polarization microscopy technique useful in discriminating complex phases of solid materials. The DIC photomicrographs set forth in FIGS. 1A–1D show particles of RAP intimately surrounded by LCP and dispersed throughout the LLDPE constituting the bulk of the section. The LCP surrounding discrete RAP particles manifests itself by a change in the color contrast of the image, which is shown to occur only in the regions around the RAP particles.

EXAMPLE 5

The present example provides fire performance data relevant to the general methods and specific formulation blend previously disclosed in Example 3. A cone calorimeter, having been designed and constructed in accordance with the latest information available from the National Institute of Standards and Technology (NIST) and known to those skilled in the art of fire risk assessment, was used for performing the relevant aspects of ASTM Method E1354-92. This apparatus is used to determine the heat release rate of materials, one of the most important fire parameters for the assessment of fire hazard. Other parameters useful in the assessment of fire performance as evaluated on the cone calorimeter include time to ignition, rate of mass loss, smoke evolution, and effective heat of combustion.

The test method is intended to measure and describe the properties of materials in response to heat and flame under controlled laboratory conditions. The results are not intended to be used alone to describe or appraise the fire hazard or the fire risk of materials under actual fire conditions. However, the results of this test are provided in the present example as a key element to fire hazard assessment which as a whole takes into account all the factors that are pertinent to an assessment of fire hazard of a particular end use application.

Test specimens, each measuring 4×4×0.113 inches, were cut from a larger 17×19×0.113 inch coupon which had been heat and vacuum press-molded to size starting with irregular chips of the resultant blend described in Example 3. Control specimens consisted of unmodified LLDPE coupons of the same dimensions.

Specimen conditioning was in accordance with ASTM E1354. The coupons were tested in the horizontal orientation and exposed to a uniform heat flux of 20, 35 and 50 kW/m$^2$. The tests were run until flameout occurred or for a maximum of 15 minutes. The test parameters which were measured in the present example and which are useful in assessing the performance of each specimen by the cone calorimeter test procedure include:

Time to ignition (time to 10 sec. sustained burning on the surface);

Heat release rate per unit surface area over time;

Peak heat release rate and corresponding time;

Total heat released by the specimen; and

Average effective heat of combustion.

Test results of these parameters are set forth in Table 2 below.

TABLE 2

Summary of Results for Horizontal Heat Flux Exposures
(Control & FR Blend of Example 3)

| Heat Flux | Specimen | Time to Ignition/ Flame-Out (s) | Heat Release Rate Peak (KW/m$^2$) | Heat Release Rate At Time (s) | Total Heat Release Per Unit Surface Area (MJ/m$^2$) | Average Effective Heat of Combustion (MJ/kg) |
|---|---|---|---|---|---|---|
| 20 | Control | 266/900 | 415.44 | 440 | 81.57 | 40.98 |
| 20 | FR Blend | No Ignit. | 3.88 | 155 | 1.02 | 15.07 |
| 35 | Control | 89/720 | 666.54 | 190 | 98.30 | 42.74 |
| 35 | FR Blend | 219/780 | 584.74 | 420 | 97.25 | 36.32 |
| 50 | Control | 53/652 | 969.02 | 125 | 84.36 | 37.35 |
| 50 | FR Blend | 83/555 | 782.10 | 200 | 102.32 | 34.51 |

As the results in Table 2 illustrate, the time to ignition for this embodiment of the present invention is significantly delayed in contrast to the control specimen (i.e., equivalent host polymer, LLDPE, without fire-retardant agents) for all three horizontal heat flux conditions of the test. Moreover, ignition of the FR-blend was not observed at a heat flux of 20 kW/m$^2$, whereas the corresponding control specimen ignited 266 s into the test. Based on this data, one can compute the critical ignition flux which is defined as that heat flux which is required to cause immediate ignition of the specimen material, by plotting the reciprocal of the time to ignition versus the incident heat flux. Through linear regression analysis of this plot, one can derive an equation to a line whose intercept at the abscissa is the critical ignition flux. These values were determined to be 12.6 kW/m$^2$ and 26.7 kW/m$^2$ for the control and FR-blend specimens, respectively, thus indicating that the incident heat flux required to ignite the FR-blend material of the present example is twice that of the control specimen. This compares favorably with critical ignition flux values which have been reported for halogen-based fire retardant polymers.

The heat liberating properties of the FR-blend during combustion (i.e., above the critical ignition flux) are shown to be significantly better than the control specimens in terms of both the peak rate of heat release and the average effective heat of combustion. Furthermore, taking into consideration the ratio of the time to ignition over the corresponding peak rate of heat release, one can arrive at the single most effective indicator of overall fire hazard that can be derived from these data. This parameter is proportional to the time to flashover, and hence high values indicate a lower fire hazard. The calculated values for the control specimens are 0.134 and 0.0547 s m$^2$/kW at heat fluxes of 35 and 50 kW/m$^2$, respectively, as compared with 0.374 and 0.106 s m$^2$/kW, respectively, for the FR-blend of the present example. These values are again comparable to many halogen-based fire retardant polymers at equivalent incident heat flux conditions.

EXAMPLE 6

A twin-head counter-rotating shear mixer was used to manufacture non-emissive fire-retardant linear low density polyethylene (LLDPE). A high-load masterbatch comprising 50% RAP and 50% LCP by weight was prepared by the method described in Example 1. A 50 g aliquot of the finished masterbatch was introduced into the mixer in the form of irregular crumbs, and subsequently melted under shear conditions at 265° C. with a nitrogen blanket applied to the feed zone of the mixer. The host polymer (200 g of LLDPE) was then added to this in the molten state and the mixture heated to 265° C. while being sheared at 90 rpm. After several minutes of mixing at 90 rpm to ensure complete blending, the mixture was quickly cooled and removed from the mixing apparatus. The finished non-emissive fire-retardant LLDPE was consistent with the following composition:

10% by weight RAP (fire-retardant agent)
10% by weight LCP (encapsulant)
80% by weight LLDPE (host polymer)

EXAMPLE 7

A high-load masterbatch comprising 50% RAP and 50% LCP by weight was prepared by the method described in Example 1. A 62.5 g mass aliquot of the finished masterbatch was introduced into the mixer in the form of irregular crumbs, and subsequently melted under shear conditions at 265° C. with a nitrogen blanket applied to the feed zone of the mixer. The host polymer (187.5 g of LLDPE) was then added to this in the form of solid pellets and the mixture heated to 265° C. while being sheared at 90 rpm. After several minutes of mixing at 90 rpm to ensure complete blending, the mixture was quickly cooled and removed from the mixing apparatus. This precursory dilution (1:3 masterbatch/LLDPE) contained 31.25% by weight of RAP.

The target composition of masterbatch in host polymer was prepared from the precursory dilution to obtain the finished non-emissive fire-retardant LLDPE with a composition equal to that described in Example 6 above. For this, a 200 g mass aliquot of the precursory dilution was re-melted under shear conditions at a temperature of 165° C. until well blended. The balance of LLDPE (50 g) was then added to this precursory dilution while mixing to obtain the target composition of RAP. Mixing was continued until a homogenous blend was achieved, at which time the formulation was cooled and allowed to solidify for removal from the shear mixture.

The fire performance characteristics of the embodiment of the present invention as determined by the cone calorimetry methods previously disclosed in Example 5 are set forth in Table 3. The data demonstrates how the composition of the present example affects the peak rate of heat release at a high incident heat flux (50 kW/m$^2$), which is markedly lower than that measured for the composition of Example 3 (data shown in Example 5, Table 2).

TABLE 3

Summary of Results for Horizontal Heat Flux Exposures
(FR-Blend of Example 7)

| Heat Flux | Specimen | Time to Ignition/ Flame-Out (s) | Heat Release Rate | | Total Heat Release Per Unit Surface Area (MJ/m$^2$) | Average Effective Heat of Combustion (MJ/kg) |
|---|---|---|---|---|---|---|
| | | | Peak (kW/m$^2$) | At Time (s) | | |
| 20 | FR Blend | 771/900 | 299.0 | 890 | 33.7 | 29.1 |
| 35 | FR Blend | 78/598 | 545.5 | 240 | 106.4 | 37.2 |
| 50 | FR Blend | 34/503 | 616.8 | 130 | 90.6 | 30.7 |

EXAMPLE 8

This example demonstrates the effects of incorporating a synergist material into the host polymer of the embodiment previously described in Example 3 for the purpose of reducing the melt flow and flame-run properties that are characteristic of LLDPE while maintaining or improving the fire retardancy of the bulk material. A precursor dilution (1:1) of a high-load masterbatch (70% RAP;30% LCP) with LLDPE was prepared by the method described in Example 3. Again using a counter-rotating shear mixer, a 50 g mass aliquot of this precursor dilution was added to the mixer and subsequently melted under shear conditions, 15 rpm, at 180° C. Approximately 62.5 g of LLDPE in the form of solid pellets were slowly added to this precursor dilution while mixing until a homogenous blend was achieved. While mixing at the said temperature and rate, 19.5 g of fumed silica (CAB-O-SIL® TS-720, Cabot Corporation) was added to the mixture. After achieving a homogenous blend, an additional 62.5 g of LLDPE (solid pellets) was added to this mixture while mixing at the said temperature and rate. Mixing was continued until a homogenous blend was achieved, at which time the formulation was cooled and allowed to solidify for removal from the shear mixer. The finished non-emissive fire-retardant and low melt-flow LLDPE was consistent with the following composition:

9% by weight RAP (fire-retardant agent)

4% by weight LCP (encapsulant)

77% by weight LLDPE (host polymer)

10% by weight fumed silica (synergist)

The fire performance characteristics of the embodiment of the present invention as determined by the cone calorimetry methods previously disclosed in Example 5 are set forth in Table 4. The data indicates a significant improvement in all calorimetric parameters, particularly the peak rates of heat release at high incident heat flux, as compared with non-synergist formulation previously taught in this disclosure.

desired application; for example, one kilogram of final product. The dry admixture is transferred to the hopper of the extruder apparatus, which is then extruded at a temperature configuration ranging from about 165° C. to about 245° C. at the feed zone to the die of the extruder device and at a shear rate ranging from about 5 to about 45 rpm while maintaining a nitrogen blanket at the feed zone. Temperature and shear conditions are adjusted accordingly to sustain a minimum torque and pressure on the extruder device.

The extrudate can be collected as a contiguous rod or pelletized for subsequent manipulation. In either case, the finished product is non-emissive, fire-retardant, and has an internal structure that consists of highly oriented, elongated domains or fibrils of LCP encapsulating linear clusters of RAP within the host polymer.

Although the invention has been described with reference to specific embodiments, this description is not meant to be construed in a limited sense. Various modifications of the disclosed embodiments, as well as alternative embodiments of the inventions, will become apparent to persons skilled in the art upon the reference to the description of the invention. It is, therefore, contemplated that the appended claims will cover such modifications that fall within the scope of the invention.

What is claimed and desired to be secured as Letters Patent is as follows:

1. A flame retardant composition comprising:

a host polymer having substantially uniformly distributed therethrough a non-miscible liquid crystal polymer and red amorphous phosphorus, said liquid crystal polymer being present in a concentration sufficient to encapsulate a majority of said red amorphous phosphorus such that said majority of red amorphous phosphorus does not contact said host polymer;

said liquid crystal polymer selected from the group consisting of copolymers of (a) 6-hydroxy-2-naphthalenecarboxylic acid and 4-hydroxybenzoic acid, (b) 1,4-benzenedicarboxylic acid, aminophenol wherein the $NH_2$ and OH substitution is not specified and 6-hydroxy-2-naphthalenecarboxylic acid, (c) 1,4-benzenedicarboxylic acid, [1,1'biphenyl]-4,4'-diol and 4-hydroxybenzoic acid, and (d) 1,4-benzenedicarboxylic acid, 4-hydroxybenzoic acid, and 1,3-benzenediol.

2. The composition of claim 1, wherein said liquid crystal polymer has a melt temperature of approximately 280° C. or less.

3. The composition of claim 1 wherein said red amorphous phosphorus is combined with a compound selected from the group consisting of magnesium hydroxide, alumi-

TABLE 4

| | | Summary of Results for Horizontal Heat Flux Exposures (FR-Blend of Example 8) | | | | |
|---|---|---|---|---|---|---|
| | | Time to Ignition/ | Heat Release Rate | | Total Heat Release Per Unit Surface | Average Effective Heat of |
| Heat Flux | Specimen | Flame-Out (s) | Peak ($kW/m^2$) | At Time (s) | Area ($MJ/m^2$) | Combustion (MJ/kg) |
| 20 | FR-Blend | 447/900 | 179.1 | 490 | 55.7 | 36.8 |
| 35 | FR-Blend | 100/724 | 196.1 | 173 | 53.64 | 23.6 |
| 50 | FR-Blend | 42/513 | 237.4 | 110 | 49.0 | 20.2 |

EXAMPLE 9

This example pertains to the manufacture of a non-emissive, fire-retardant extrudate of LLDPE using a counter-rotating twin screw extruder. A high-load masterbatch comprising 40 to 70% RAP and 60 to 30% LCP by weight, respectively, is prepared in pellet form by the method described in Example 2. A dry admixture of pelletized masterbatch and pelletized LLDPE is prepared at a proportion appropriate for the target composition of RAP; for example, one part of masterbatch to six parts of host polymer (LLDPE) by weight, and of quantity suitable for the num trihydrate, antimony trioxide, zinc borates, molybdenum oxides and fumed silica treated with an organo-silicon compound before being mixed with said liquid crystal polymer to yield a synergist combination.

4. The composition of claim 3, wherein said liquid crystal polymer has a melt temperature less than the auto ignition temperature of said synergist combination.

5. The composition of claim 1, wherein said host polymer is a polymer selected from the group consisting of polypropylenes, polyethylenes, polyethylene terephthalates, polystyrenes, ethylene vinyl acetates, polycarbonates, polyurethanes and epoxy resins.

6. The composition of claim 1, wherein said red amorphous phosphorus comprises about 0.1 to about 10.0 percent by weight of said flame retardant composition.

7. The composition of claim 2 wherein said red amorphous phosphorus comprises about 0.1 to about 10.0 percent by weight of said flame retardant composition.

8. The composition of claim 1 wherein said host polymer is a polyethylene.

9. The composition of claim 5 wherein said liquid crystal polymer is a copolymer of 6-hydroxy-2-naphthalenecarboxylic acid and 4-hydroxybenzoic acid.

10. The composition of claim 1, wherein said host polymer is combined with a compound selected from the group consisting of magnesium hydroxide, aluminum trihydrate, antimony trioxide, zinc borates, molybdenum oxides and fumed silica treated with an organo-silicon compound.

11. The composition of claim 5, wherein said host polymer is combined with a compound selected from the group consisting of magnesium hydroxide, aluminum trihydrate, antimony trioxide, zinc borates, molybdenum oxides and fumed silica treated with an organo-silicon compound.

12. The composition of claim 8, wherein said host polymer is combined with a compound selected from the group consisting of magnesium hydroxide, aluminum trihydrate, antimony trioxide, zinc borates, molybdenum oxides and fumed silica treated with an organo-silicon compound.

13. A flame retardant composition, comprising:

about 0.1 to about 20% by weight of red amorphous phosphorus;

about 0.1 to about 15% by weight of liquid crystal polymer;

about 65 to about 99.8% of host polymer;

said liquid crystal polymer encapsulating a majority of said red amorphous phosphorus, such that said majority of red amorphous phosphorus does not contact said host polymer;

said host polymer selected from the group consisting of polypropylenes, polyethylenes, polyethylene terephthalates, polystyrenes, ethylene vinyl acetates, polycarbonates, polyurethanes and epoxy resins;

said liquid crystal polymer selected from the group consisting of copolymers of (a) 6-hydroxy-2-naphthalenecarboxylic acid and 4-hydroxybenzoic acid, (b) 1,4-benzenedicarboxylic acid, aminophenol wherein the $NH_2$ and OH substitution is not specified and 6-hydroxy-2-naphthalenecarboxylic acid, (c) 1,4-benzenedicarboxylic acid, [1,1'biphenyl]-4,4'-diol and 4-hydroxybenzoic acid, and (d) 1,4-benzenedicarboxylic acid, 4-hydroxybenzoic acid, and 1,3-benzenediol.

14. The composition of claim 13 wherein said percentage of red amorphous phosphorus is about 4 to about 10% by weight;

said percentage of liquid crystal polymer is about 4 to about 10% by weight;

said percentage of host polymer is about 80 to about 92% by weight;

said liquid crystal polymer is a copolymer of 6-hydroxy-2-naphthalenecarboxylic acid and 4-hydroxybenzoic acid, and said host polymer is a polyethylene.

15. The composition of claim 13, further comprising about 1% to about 50% by weight of a compound selected from the group consisting of magnesium hydroxide, aluminum trihydrate, antimony trioxide, zinc borates, molybdenum oxides and fumed silica treated with an organo-silicon compound.

16. The composition of claim 14, further comprising about 5% to about 20% by weight of a compound selected from the group consisting of magnesium hydroxide, aluminum trihydrate, antimony trioxide, zinc borates, molybdenum oxides and fumed silica treated with an organo-silicon compound.

17. A process of preparing a flame retardant composition with reduced phosphine emissions, comprising the steps of:

combining a liquid crystal polymer and red amorphous phosphorus to yield a homogeneous mixture; and mixing said homogeneous mixture with a host polymer that is immiscible with said liquid crystal polymer to yield a composition having highly oriented domains of said liquid crystal polymer surrounding a substantial portion of said red amorphous phosphorus;

said liquid crystal polymer selected from the group consisting of copolymers of (a) 6-hydroxy-2-naphthalenecarboxylic acid and 4-hydroxybenzoic acid, (b) 1,4-benzenedicarboxylic acid, aminophenol wherein the $NH_2$ and OH substitution is not specified and 6-hydroxy-2-naphthalenecarboxylic acid, (c) 1,4-benzenedicarboxylic acid, [1,1'biphenyl]-4,4'-diol and 4-hydroxybenzoic acid, and (d) 1,4-benzenedicarboxylic acid, 4-hydroxybenzoic acid, and 1,3-benzenediol.

18. The process of claim 17 wherein said liquid crystal polymer has a melt temperature of approximately 280° C. or less.

19. The process of claim 17 wherein said red amorphous phosphorus is combined with a compound selected from the group consisting of magnesium hydroxide, aluminum trihydrate, antimony trioxide, zinc borates, molybdenum oxides and fumed silica treated with an organo-silicon compound, before being mixed with said liquid crystal polymer to yield a synergist combination.

20. The process of claim 19, wherein said liquid crystal polymer has a melt temperature less than the auto ignition temperature of said synergist combination.

21. The process of claim 17, wherein said host polymer is a polypropylene, polyethylene, polyethylene terephthalate, polystyrene, ethylene vinyl acetate, polycarbonate, polyurethane or an epoxy resin.

22. The process of claim 17 wherein said host polymer is combined with a compound selected from the group consisting of magnesium hydroxide, aluminum trihydrate, antimony trioxide, zinc borates, molybdenum oxides and fumed silica treated with an organo-silicon compound.

23. The process of claim 21 wherein said host polymer is combined with a compound selected from the group consisting of magnesium hydroxide, aluminum trihydrate, antimony trioxide, zinc borates, molybdenum oxides and fumed silica treated with an organo-silicon compound.

24. A process of preparing a flame retardant composition with reduced phosphine emissions comprising the steps of:

melting a liquid crystal polymer in a mixing apparatus;

adding red amorphous phosphorus to said melted liquid crystal polymer until a homogenous blend of liquid crystal polymer and red amorphous phosphorus is achieved;

allowing said homogenous blend to cool;

processing said homogenous blend into irregular crumbs or pellets;

melting said irregular crumbs or said pellets of said processed homogenous blend in said mixing apparatus;

adding a host polymer that is immiscible with said liquid crystal polymer to said mixing apparatus;

mixing said homogenous blend and said host polymer to yield a composition having highly oriented domains of said liquid crystal polymer surrounding a majority of said red amorphous phosphorus;

said liquid crystal polymer selected from the group consisting of copolymers of (a) 6-hydroxy-2-naphthalenecarboxylic acid and 4-hydroxybenzoic acid, (b) 1,4-benzenedicarboxylic acid, aminophenol wherein the $NH_2$ and OH substitution is not specified and 6-hydroxy-2-naphthalenecarboxylic acid, (c) 1,4-benzenedicarboxylic acid, [1,1'biphenyl]-4,4'-diol and 4-hydroxybenzoic acid, and (d) 1,4-benzenedicarboxylic acid, 4-hydroxybenzoic acid, and 1,3-benzenediol.

25. The process of claim 24 wherein said homogenous blend contains less than about 50.0 percent by weight of said liquid crystal polymer.

26. A process of preparing a flame retardant composition with reduced phosphine emissions comprising the steps of:

melting a liquid crystal polymer in a mixing apparatus;

mixing red amorphous phosphorus with said melted liquid crystal polymer to yield a homogenous blend of liquid crystal polymer and red amorphous phosphorus;

allowing said homogenous blend to cool;

processing said homogenous blend into coarse powder;

melting a host polymer that is immiscible with said liquid crystal polymer in said mixing apparatus at a temperature less than or about equal to the melt temperature of said liquid crystal polymer;

adding said coarse powder to said mixing apparatus;

mixing said homogenous blend in said host polymer to yield a composition having highly oriented domains of said liquid crystal polymer surrounding a majority of said red amorphous phosphorus such that said majority of said red amorphous phosphorus does not contact said host polymer;

said liquid crystal polymer selected from the group consisting of copolymers of (a) 6-hydroxy-2-naphthalenecarboxylic acid and 4-hydroxybenzoic acid, (b) 1,4-benzenedicarboxylic acid, aminophenol wherein the $NH_2$ and OH substitution is not specified and 6-hydroxy-2-naphthalenecarboxylic acid, (c) 1,4-benzenedicarboxylic acid, [1,1'biphenyl]-4,4'-diol and 4-hydroxybenzoic acid, and (d) 1,4-benzenedicarboxylic acid, 4-hydroxybenzoic acid, and 1,3-benzenediol.

27. A process of preparing a flame retardant composition with reduced phosphine emissions comprising the steps of:

adding dry liquid crystal polymer and dry red amorphous phosphorus to an extruder;

extruding said liquid crystal polymer and red amorphous phosphorus at sufficient RPMs and temperature to yield a homogenous extrudate of red amorphous phosphorus and liquid crystal polymer;

preparing a dry blend of said extrudate and a host polymer that is immiscible with said liquid crystal polymer;

adding said dry blend to said extruder;

extruding said mixture to yield a composition having an internal structure of highly oriented clusters of red amorphous phosphorus encapsulated in domains of liquid crystal polymer such that a substantial portion of red amorphous phosphorus does not contact said host polymer;

said liquid crystal polymer selected from the group consisting of copolymers of (a) 6-hydroxy-2-naphthalenecarboxylic acid and 4-hydroxybenzoic acid, (b) 1,4-benzenedicarboxylic acid, aminophenol wherein the $NH_2$ and OH substitution is not specified and 6-hydroxy-2-naphthalenecarboxylic acid, (c) 1,4-benzenedicarboxylic acid, [1,1'biphenyl]-4,4'-diol and 4-hydroxybenzoic acid, and (d) 1,4-benzenedicarboxylic acid, 4-hydroxybenzoic acid, and 1,3-benzenediol.

28. An electrical wire coating substantially comprised of the flame retardant composition of claim 1.

29. A shaped article comprising the composition of claim 1.

* * * * *